April 26, 1966  J. S. MATTERN ETAL  3,248,194
METHOD OF MAKING MULTIFOCAL LENSES
Filed Dec. 22, 1961  2 Sheets-Sheet 1
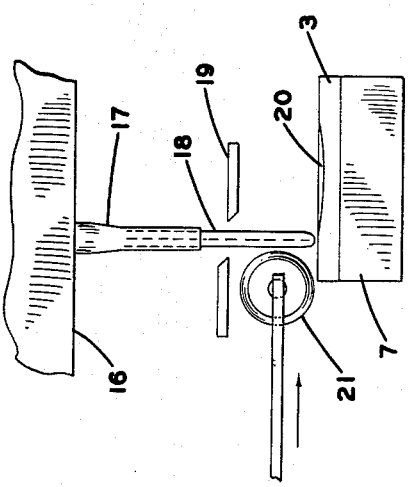
FIG. 2
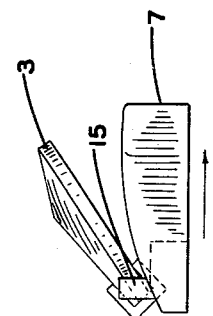
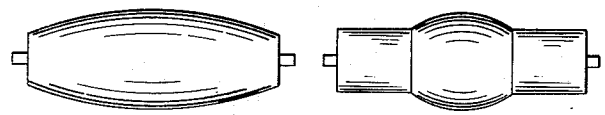
FIG. 8  FIG. 9
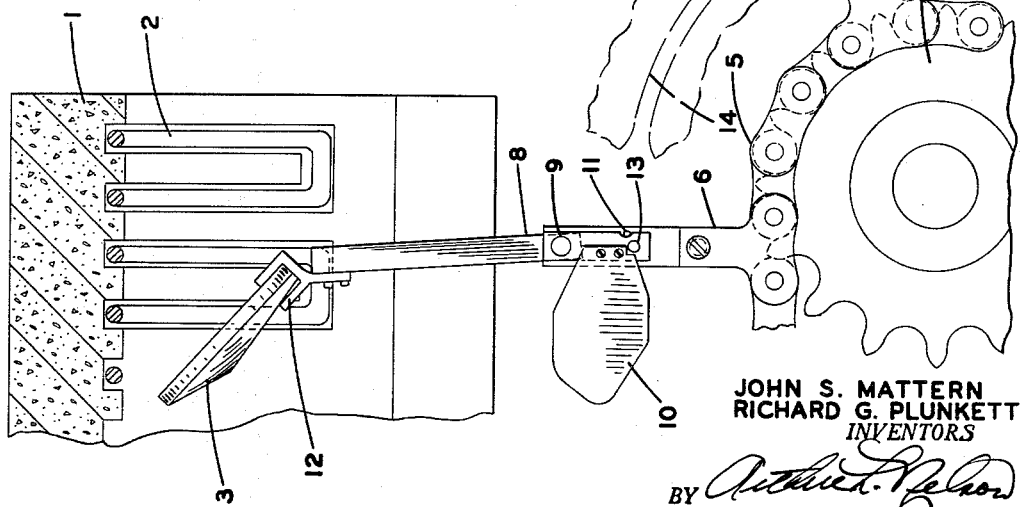
FIG. 1
JOHN S. MATTERN
RICHARD G. PLUNKETT
INVENTORS
BY *Arthur L. Nelson*
*Frank C. Parker*
ATTORNEYS

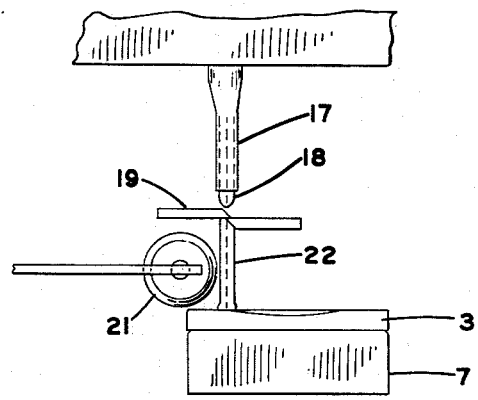
FIG. 3
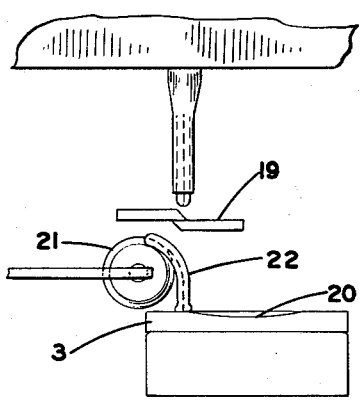
FIG. 4
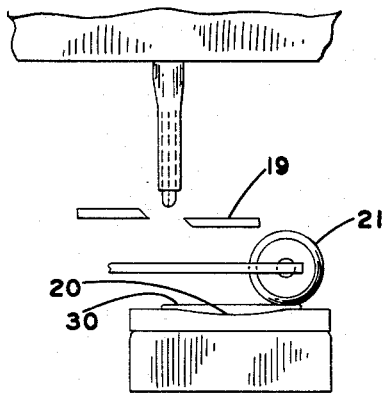
FIG. 5
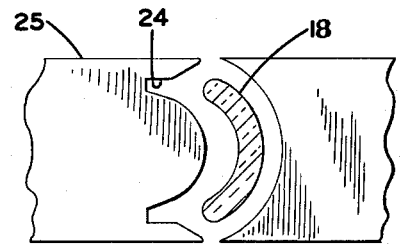
FIG. 6
FIG. 7
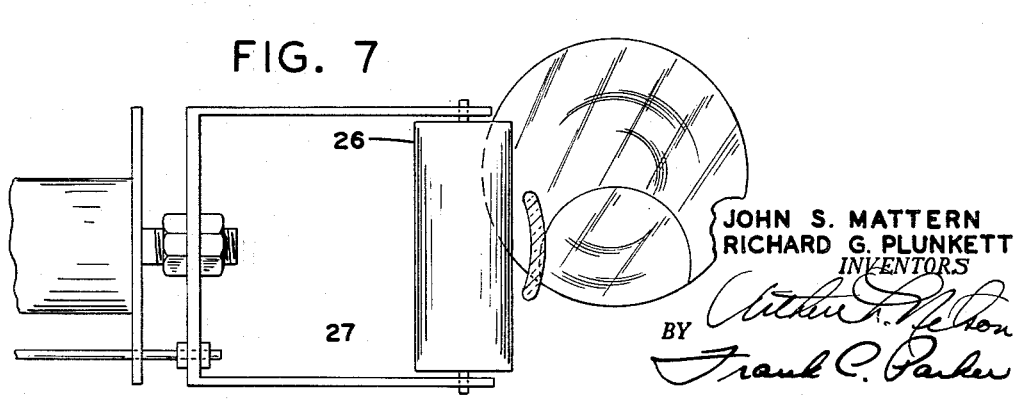
JOHN S. MATTERN
RICHARD G. PLUNKETT
INVENTORS
ATTORNEYS

United States Patent Office 3,248,194
Patented Apr. 26, 1966

3,248,194
METHOD OF MAKING MULTIFOCAL LENSES
John S. Mattern, North Chili, and Richard G. Plunkett, Greece, N.Y., assignors to Bausch & Lomb Incorporated, Rochester, N.Y., a corporation of New York
Filed Dec. 22, 1961, Ser. No. 161,559
2 Claims. (Cl. 65—39)

This invention relates to multifocal ophthalmic lenses and more particularly to a method of fusing the components of a multifocal lens.

In the field of manufacturing ophthalmic lenses, special problems arise particularly where more than one element of the lens is fused together to form a multifocal lens. The fusion of the bifocal segment on the lens blank must be accomplished through an efficient operation and yet maintain the highest quality lens possible. It is necessary that the interfaces at the point of fusion are maintained in a clean condition and also that the temperatures are suitable for proper fusing. The fusion must be complete and prevent any thermal history shadow, air lake, distortion of the major blank or excessive stress concentration causing a defect or crack prior to annealing operations.

Accordingly, this invention relates to a means for rolling a viscous gob on a lens blank to form the bifocal segment on the composite lens.

It is an object of this invention to fuse the components of a multifocal lens to produce a composite lens of consistently high quality.

It is another object of this invention to sever a molten segment from a glass orifice and uniformly fuse the segment to a lens blank by means of a rolling mechanism to provide uniform fusion of the interface.

It is a further object of this invention to provide a crescent shaped orifice delivering a molten gob which is rolled onto the countersink surface of the lens blank by a raised center roller to unitize the bifocal segment with the lens blank through a fusion operation.

It is a further object of this invention to provide a molten gob of glass extruded in a crescent shape mating the countersink surface to provide a uniform fusion of the gob with lens blank in forming a bifocal segment for a composite lens.

The objects of this invention are accomplished by providing an orifice for molten glass preferably having a crescent cross section. The molten glass is extruded at a point adjacent to the edge of the countersink surface on the lens blank and also adjacent a roller mechanism. The shearing operation of a gob from the extruded molten glass throws the gob on the side of the roller. The roller moves forwardly rolling the gob on the countersink surface in the lens blank and uniformly presses the gob onto the surface to provide a quality fusion operation. The fusion is initiated on the edge of the countersink and progressively moves across the countersink surface as the roller advances across the surface. The cross section of the gob from the orifice and also the surface of the roller is adapted to generally conform to a cross section on the countersink surface. In this manner the molten glass is evenly rolled on the surface and there is no delay in fusion to cause a thermal pattern. The general conformation of shapes of the viscous gob as it is laid on a countersink surface provides an even fusion and complete fusion as the temperatures of the uniting surfaces can be uniformly controlled.

The following figures illustrate the preferred version of the fusion method. Various modifications of this method might be devised which fall in within the spirit of the invention of which the preferred version is illustrated in the following figures.

FIG. 1 illustrates the pre-heating furnace and the mechanism carrying the lens and depositing the lens on the lens platform.

FIG. 2 illustrates the orifice and the molten glass being extruded therefrom adjacent the countersink surface of the lens blank and adjacent the roller mechanism.

FIG. 3 illustrates the shearing operation of the extruded glass.

FIG. 4 illustrates the completion of the shearing operation and the depositing of the glass gob on the roller.

FIG. 5 illustrates the shearing mechanism in its retracted position with the roller in the advanced position having completed the rolling of the gob to form a bifocal segment fused in the countersink of the lens blank.

FIG. 6 illustrates a version of the shearing operation wherein crescent shaped cutters are employed to sever the crescent shaped extruded molten glass.

FIG. 7 is a plan view of a modified roller mechanism illustrating a cylindrical shape which may be employed on the roller and also a modification in the orifice configuration.

FIG. 8 is a view of a roller modification.

FIG. 9 is a view of a roller adapted for operation with a crescent orifice illustrated in FIG. 6.

Referring to FIG. 1, the mechanism for conveying the lens blank to the lens platform is illustrated. The lens blanks are carried through a furnace to raise the temperature of the lens blank and particularly the surface of the countersink area to provide the proper fusion temperature of the lens blank.

The furnace 1 is heated through a plurality of coils 2 which are positioned in the area immediate to the passage of the lens blanks 3. The furnace is constructed of a suitable insulating and refractory material to retain the heat and provide a uniform temperature and dirt-free environment of predetermined magnitude.

The sprocket 4 provides a driving mechanism for the sprocket chain 5. The sprocket chain 5 comprises a plurality of links. A carrier arm 6 is mounted on one of the links in the chain for supporting of the rod 8. The arm carrying links are inserted in predetermined intervals in the chain to provide the proper timing of the lens carrier for deposition of the lens blank on the lens platform 7.

The arm 6 is pivotally connected to the rod 8 by means of the pin 9. The rod 8 carries a counterweight 10 which maintains the lower end of the rod 8 in an engaging position with the boss 11. The rod 8 supports a holder 12 which consists of a plurality of fingers supporting the lens 3. As the chain 5 rotates on the sprocket 4 the lens 3 is moved horizontally through the furnace 1 and brought to the desired temperature prior to fusion. As the link carrying the arm 6 rotates about the sprocket 4 the cam pin 13 is received within the cam slot 14 which is shown in phantom in FIG. 1. The cam slot 14 prevents the weight of the lens 3 and the counterweight 10 from over-balancing and losing the lens. The cam slot engaging the cam pin 13 retards the forward movement of the carrier to provide a proper movement for depositing the lens 3 on the lens platform 7. The struts 15 engage the rearward side of the lens 3 and strip the lens 3 from the holder 12 and deposit the lens 3 on the platform 7.

The lens platform 7 is carried on a rotating table, not shown, which rotates the lens and the lens blank 3 and the platform 7 for subsequent operations.

FIG. 2 illustrates the lens blank 3 on the lens platform 7 in position for fusion of the bifocal segment. A container 16 contains molten glass which is fed through the orifice 17 to form the extruded glass 18. The shearing mechanism 19 is shown on opposing sides of the extruded molten glass 18. The countersink surface 20 is positioned with the edge of the countersink adjacent to the extending end of the extruded molten glass 18.

The roller 21 is positioned adjacent to the extruded molten glass 18 and moves in a horizontal direction as indicated by the arrow. The roller 21 has a raised center portion generally conforming to the crescent shaped cross section of the extruded molten glass 18.

FIG. 3 illustrates the shearing operation wherein a portion of the extruded molten glass 18 is severed by the shears 19 to form a molten gob 22. The lens blank 3 and lens platform 7 are located in the same position as illustrated in FIG. 2 relative to the orifice 17.

FIG. 4 discloses the shears 19 completely severing the gob 22 and throwing the upper end of the gob over the roller 21. In this illustration the gob 22 engages the lens blank 3. In FIG. 5 the roller has advanced horizontally across the countersink surface 20 providing the fusing between the gob 22 and the countersink surface 20. FIG. 5 illustrates the shears 19 in its retracted position and the roller 21 in its most advanced position with the gob 20 fused within a countersink area 20. The fusion operation is completed at this point and the roller 21 is retracted in a reciprocating movement across the upper surface of the segment 22. As the roller 21 is retracted it again returns to the position illustrated in FIG. 2. The lens and platform are rotated away from the roller. The molten glass continues to extrude from the orifice 17 for fusion with a subsequent lens blank. The cycle again is repeated on a subsequent lens blank.

The shearing operation is accomplished by a shear similar to that illustrated in FIG. 6. The extruded molten glass 19 is extruded by a crescent shaped orifice. The shears are also of crescent shape mating the configuration of the orifice. The general configuration of the crescent shape is retained during cutting by the crescent shape of the shears and the guiding edges 24 of the cutter 25. FIG. 6 illustrates a crescent shape cutter and extruded molten glass and is extreme in its curvature to illustrate the configuration. It is not necessary that the crescent shape be curved as greatly as illustrated. The curvature generally conforms to the curvature of the countersink surface in the lens blank to provide an even fusion as the roller rolls across the gob which is deposited in the countersink. It is preferable that the curvature of the orifice be slightly greater than the curvature in the countersink surface to cause a fusion in the center portion of the gob which is uniformly rolled to its outer edge as a roller passes over the gob to form a fused segment in the composite lens.

FIG. 7 is a plan view illustrating the roller mechanism. The cross section of the extruded molten glass 18 has a lesser degree of curvature than that illustrated in FIG. 6. The roller is a cylindrical roller as illustrated. Modifications are illustrated in FIGS. 8 and 9 which disclose a curvature on the roller. The curvature of the roller is not as critical as the curvature of the crescent shape of the orifice. It is possible to use a crescent shaped orifice with a cylindrical roller and still maintain uniform fusion throughout the interfaces of the bifocal segment and the lens blank. The fusion between the lens blank and the molten glass is accomplished through the uniform movement and the mating of the surfaces which are fused. By controlling the engagement of the mating fusing surfaces, fusion is accomplished with a minimum amount of deformation of the gob as it is rolled onto the countersink surface.

The method of operation will be described in the following paragraphs. FIG. 1 illustrates a means for heating the lens blank 3 to a predetermined temperature wherein the lens blank is retained in a solid state and the countersink surface 20 on the lens blank is raised to a semi-fluid or tacky condition in preparing an ideal condition for fusion. The lens blank 3 is then deposited on the lens platform 7 with the countersink surface 20 in a substantially horizontal position. The lens platform is positioned adjacent to the extruding molten glass 18. FIG. 2 illustrates the position wherein the molten glass 18 is extruded through the orifice 17. The roller 21 operates in a horizontal direction and is positioned adjacent to the molten glass 18. The molten glass 18 is in a viscous state and is uniformly extruded from the orifice until it is extending to a position adjacent the countersink 20 in the lens blank 3.

The molten glass 18 is then sheared by the shearing mechanism 19. The gob 22 is formed by the sheared portion of the molten glass 18. The shearing mechanism 19 has a lower portion of the shear on the opposing side of the gob from the roller 21. The shearing action of the shears 19 with the lower portion of the shear moving toward the glass throws the gob 22 on the roller 21.

The shearing action is completed in FIG. 4 and the gob 22 is thrown on to the roller 21. The lower tip of the gob engages the lens blank 3. The gob having a crescent shape generally conforms to the shape of the roller with a crescent portion of the gob mating with the raised portion of the roller 21.

An alternate method would eliminate FIG. 4 where the gob is not thrown in either direction, but merely sheared and anchored on the lens blank.

FIG. 5 illustrates the completed shearing operation with the shear in the retracted position and the roller having advanced across the countersink surface 20. The rate of movement of the roller across the countersink surface 20 is uniform thereby causing a uniform fusion throughout the movement of the roller mechanism. The gob 22 forms a bifocal segment 30 as it is fused with the lens blank 3.

The roller 21 is then retracted in the reciprocating manner to the position shown in FIG. 2 and the cycle for fusing a bifocal segment on a lens blank is complete. The composite multifocal lens is then rotated from the position adjacent the roller and transferred to an annealing operation.

The movement of the roller in the preforming of the fusing surfaces of the interface of the bifocal segment and the countersink surface eliminates any thermal history mark which may be present on a composite lens formed in a conventional manner. The thermal history mark is not always apparent when viewed in daylight but is readily apparent through examination by use of arc-light. The air lake often present between the fusing surfaces in the interface is also eliminated in a process of this kind, the complete fusion is accomplished through the uniform pressure of the roller on the gob and also the uniform movement of the roller. The thickness of the gob may be reduced in this type of a process thereby reducing the quantity of glass needed for forming a bifocal segment. By the use of a lesser quantity of glass for the segment the risk of breakage is also reduced as the amount of heat transfer is substantially less.

The device as illustrated and described is a preferred embodiment of this invention, and claimed in the following attached claims.

What is claimed is:

1. The method of forming a multi-focal lens comprising, preheating a lens blank having a major surface and a minor countersink surface to form a tacky condition of the countersink surface, positioning the lens blank whereby the countersink surface is in a substantially horizontal position, extruding a crescent shaped stream of molten glass adjacent the edge of the countersink surface of the lens blank, severing a segment of the stream of molten glass and positioning the severed segment on its end for fusing on the major surface adjacent the edge of the countersink surface of the lens blank, progressively rolling the severed segment from the initial point of fusion across the countersink surface with a uniform pressure and thereby forming a continuous interface between the severed segment of the stream of molten glass and the countersink surface of the lens blank to form a multi-focal lens.

2. The method of forming a multi-focal lens comprising, preheating a lens blank having a major surface and curved recess forming a countersink surface to provide a semi-fluid condition on the countersink surface, positioning the lens with the countersink surface in a substantially horizontal position, extruding a crescent shaped stream of molten glass having a convex curvature slightly great than the curvature of the countersink surface, severing a segment of the stream of molten glass and positioning the end of the severed segment at a point on the major surface adjacent the countersink surface with the convex curvature of the severed segment facing the countersink surface and fusing the lower end of the severed segment to the lens blank, progressively rolling the severed segment of the molten glass from the initial point of the fusion across the countersink surface and flattening the severed segment into intimate contact with the countersink surface to prevent any air entrapment at the fused interface to thereby provide a composite multi-focal lens.

References Cited by the Examiner

UNITED STATES PATENTS

| 2,734,315 | 2/1956 | Poundstone | 65—39 |
| 3,130,029 | 4/1964 | Cala | 65—39 |

FOREIGN PATENTS 1,095,567 11/1960 France.

DONALL H. SYLVESTER, *Primary Examiner.*

F. W. MIGA, *Assistant Examiner.*